United States Patent
Wen

(10) Patent No.: US 7,826,737 B2
(45) Date of Patent: Nov. 2, 2010

(54) IMAGE PICKUP APPARATUS AND FOCUSING METHOD THEREOF

(75) Inventor: Zhi-Hui Wen, Guangdong (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 202 days.

(21) Appl. No.: 12/178,649

(22) Filed: Jul. 24, 2008

(65) Prior Publication Data
US 2009/0169193 A1 Jul. 2, 2009

(30) Foreign Application Priority Data
Dec. 28, 2007 (CN) .................. 2007 1 0203505

(51) Int. Cl.
*G03B 17/00* (2006.01)
(52) U.S. Cl. .......................... 396/133; 396/86
(58) Field of Classification Search .............. 396/86, 396/127, 133
See application file for complete search history.

(56) References Cited
U.S. PATENT DOCUMENTS

| 4,347,590 A | * | 8/1982 | Heger et al. ............... 367/93 |
| 4,639,588 A | * | 1/1987 | Shinoda .................... 250/201.2 |
| 5,305,038 A | * | 4/1994 | Mogamiya ................... 396/86 |
| 5,638,217 A | * | 6/1997 | Hirasawa et al. ............ 359/698 |
| 5,805,305 A | * | 9/1998 | Abe .......................... 358/3.13 |
| 7,085,073 B1 | * | 8/2006 | Han et al. .................. 359/698 |
| 2004/0253742 A1 | * | 12/2004 | Affleck et al. ............... 436/165 |
| 2006/0188242 A1 | * | 8/2006 | Sugiura ....................... 396/86 |
| 2007/0133969 A1 | * | 6/2007 | Ish-Shalom et al. ........... 396/89 |

* cited by examiner

*Primary Examiner*—W. B. Perkey
*Assistant Examiner*—Warren K Fenwick
(74) *Attorney, Agent, or Firm*—Zhigang Ma

(57) ABSTRACT

An imaging pickup apparatus includes a lens module and a motor. The body includes a camera module configured for sensing an image. The motor is configured for driving the lens module to move in increments that are multiple steps of the motor. The multiplier used are "x" and "y" during an auto focus process. The image pickup apparatus includes a preset step number. Initially, the motor drives the lens module to move by increments of "x" steps. When the number of steps moved by the motor is greater than or equal to the preset step number, the motor drives the lens module to move by increment of "y" steps.

13 Claims, 4 Drawing Sheets

IMAGE PICKUP APPARATUS AND FOCUSING METHOD THEREOF

TECHNICAL FIELD

The present invention relates to an image pickup device and a focusing method thereof, and specifically, to a lens module driving system and method for use in an autofocus camera.

BACKGROUND

As for an image pickup apparatus, such as a digital camera which captures an image of an object with an image sensor (e.g., a charged coupled device (CCD) or the like), a contrast method is generally adopted as an auto focus (AF) method. The contrast method uses contrast of an object image to achieve auto focus. Lenses of a camera are controlled to obtain a maximum contrast from the image signals so as to automatically focus on the object using the maximum contrast position as a best focusing point. Focusing the camera this way takes time and an opportunity for good photos may be missed.

Therefore, it is desired to provide a camera with a faster focusing process for auto focus.

SUMMARY

In accordance with an embodiment, an image pickup apparatus is provided. The image pickup apparatus includes a lens module and a motor. The motor is configured for driving the lens module to move in increments that are multiple steps of the motor. The multiplier used are "x" and "y" during an auto focus process. Initially, the motor 3 drives the lens module 2 to move by increments of "x" (steps) seeking the best focus position in a far object distance region and when failing that, driving the lens module 2 to move by increments of "y" (steps) in a near object distance region until the best focus position is found. After each incremental movement, an image is captured for contrast measurement.

Other novel features and advantages will be drawn from the following detailed description of at least one preferred embodiment, when considered in conjunction with the attached drawings.

BRIEF DESCRIPTION OF THE DRAWINGS

Many aspects of the present image pickup apparatus and focusing method can be better understood with reference to the accompanying drawings. The components in the drawings are not necessarily drawn to scale, the emphasis instead being placed upon clearly illustrating the principles of the present image previewing system and method. Moreover, in the drawings, like reference numerals designate corresponding parts throughout the several views.

DETAILED DESCRIPTION

Embodiments of the present focusing method and image capturing device will now be described in detail below with reference to the drawings.

Figure 1:
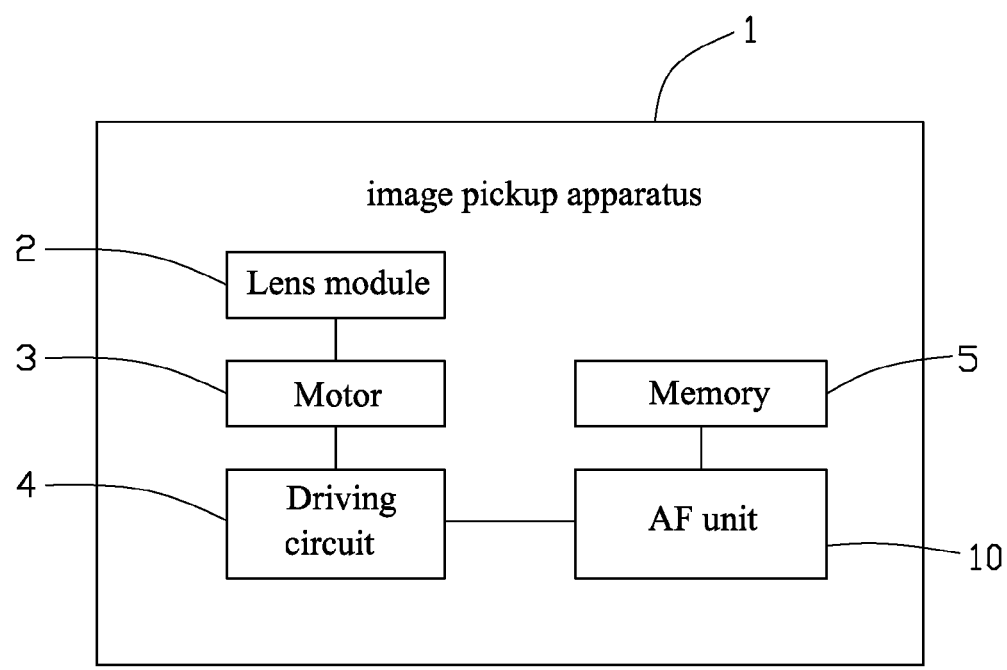
FIG. 1 is a block diagram of an image pickup apparatus in accordance with an exemplary embodiment of the present invention.

Referring to FIG. 1, a block diagram of an image pickup apparatus 1 in accordance with an exemplary embodiment is shown. The apparatus 1 is capable of performing an auto focus (AF) process, and includes a lens module 2, a motor 3, a driving circuit 4, a memory 5, and an AF unit 10. In this embodiment, the apparatus 1 is a digital camera.

The motor 3 can be a step motor configured for driving the lens module 2 to move for performing the AF process. The driving circuit 4 is configured for receiving signals from the AF unit 10 to control the motor 3. The lens module 2 can be incorporated with an image sensor such as a charged couple device (CCD). In many cases, the image sensor has an AF mode, in which only a part of the image sensor is used, to enhance AF speed.

The AF unit 10 is configured for extracting AF data, e.g., contrast measurements, from the image signals, and instructing the driving circuit 4 to drive the motor 3 to move the lens module 2 based on the AF data, thereby focusing the apparatus 1. The AF unit 10 examines current image pixels and the difference in intensity among adjacent pixels. If the scene is out of focus, adjacent pixels have very similar intensities. The AF unit 10 sends signals to the driving circuit 4 to move the lens to capture another image, and examines pixels again and sees if the difference in intensity between adjacent pixels has improved or gotten worse. The AF unit 10 repeats the process until it finds the maximum intensity difference between adjacent pixels. The lens position where the image has the maximum intensity is the point of best focus.

The memory 5, which may be a random-access memory (RAM) or the like, is configured for storing the AF data. In this embodiment, the AF data includes pixel contrast measurements of images.

Figure 2:
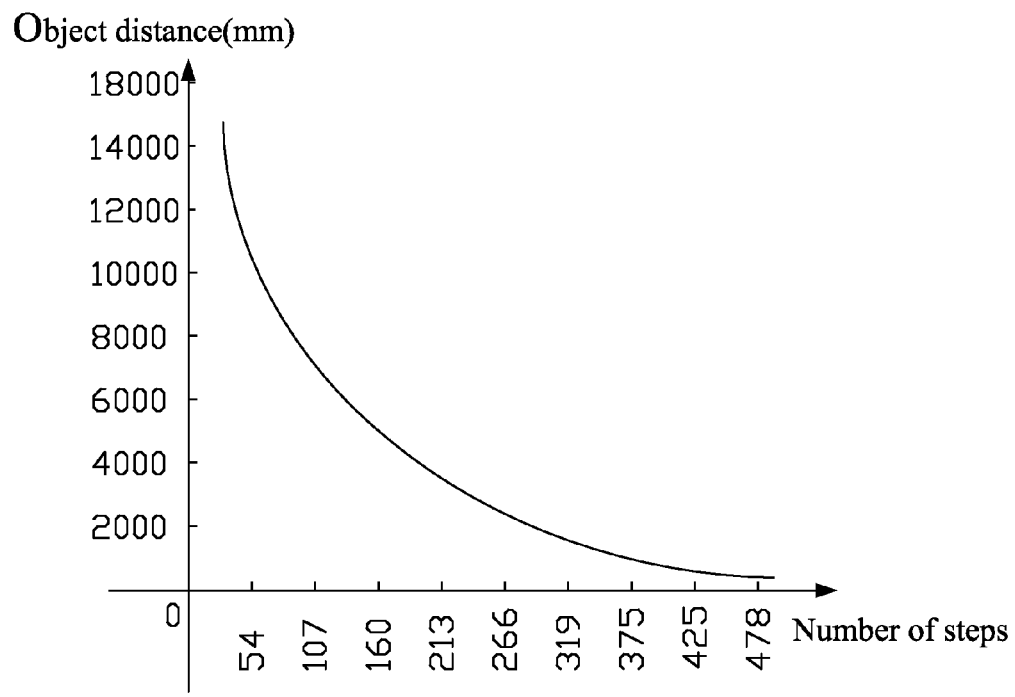
FIG. 2 is a graph showing a relationship between object distance and moving steps of a motor in the image pickup apparatus of FIG. 1.

Referring to FIG. 2, a graph shows a relationship between object distance and a number of steps the motor 3 moves the lens module 2 from a point of origin, which is the point at which the lens is focused on infinity, to focus the apparatus 1. It is easy to see that, to achieve a same object distance during an AF process, a greater number of steps are required in a smaller object distance.

Therefore, a greater number of increment values moved by the lens module 2 may be utilized for contrast measurement in the near object distance region during AF to speed up the AF process. In a preferred embodiment, the motor 3 drives the lens module 2 to move by increments of "x" or "y" steps in different regions of the focus process. After each incremental move is made, an image is captured and examined. The AF unit 10 is preset to use "x" as the multiplier during initial AF when the lens module is positioned to focus on infinity. The lens module is moved by increments of "x" (steps) shortening the object distance until best focus is achieved or, the lens is focusing at object distances predetermined to fall in a near object distance region at which time the AF unit uses the "y" multiplier to move the lens by increments of "y" (steps).

Figure 3:
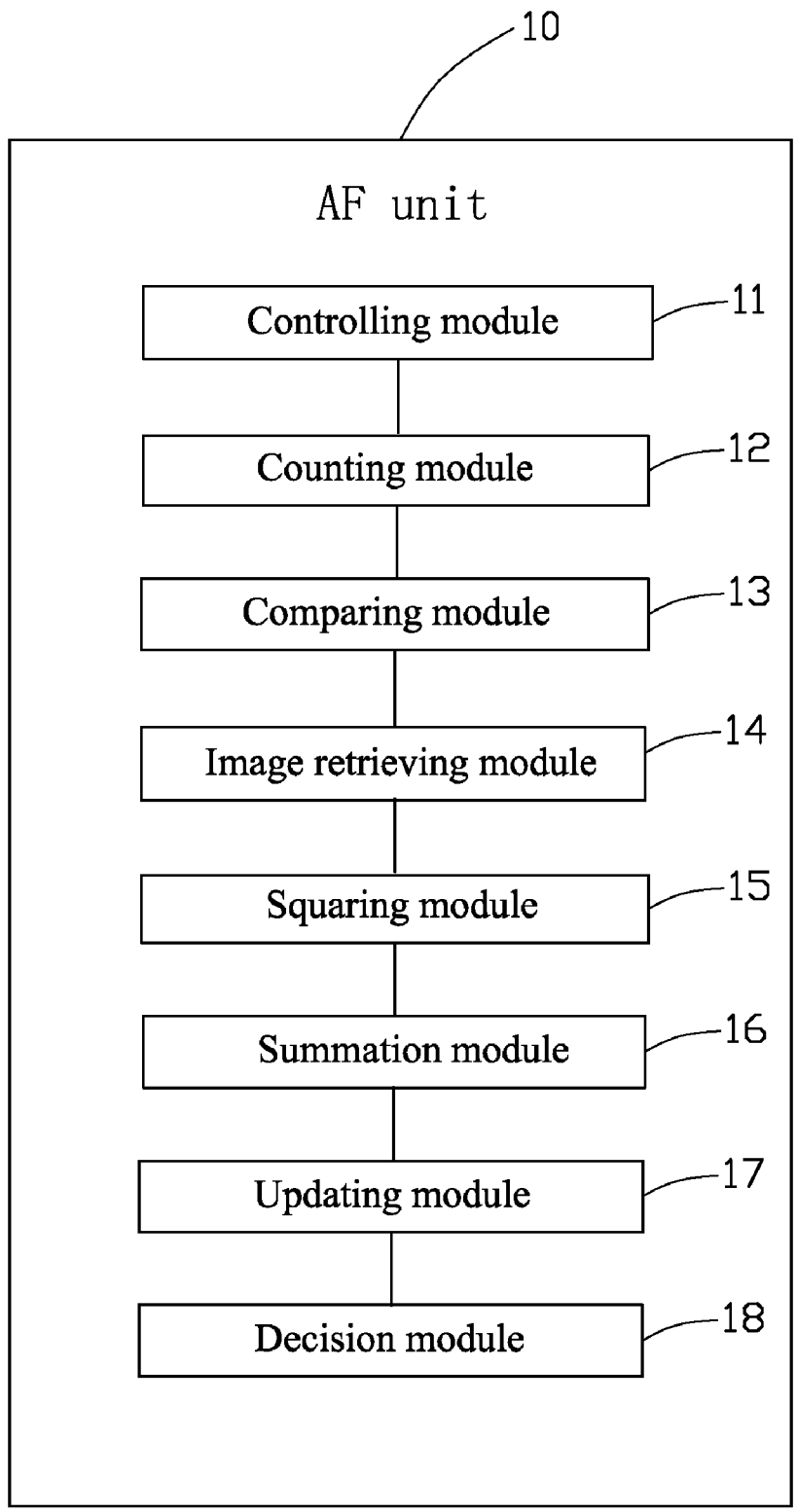
FIG. 3 is a block diagram of an auto focus unit of the image pickup apparatus of FIG. 1.

Referring to FIG. 3, a block diagram of the AF unit 10 is shown. The AF unit 10 includes a controlling module 11, a counting module 12, a comparing module 13, an image retrieving module 14, a squaring module 15, a summation module 16, an updating module 17, and a decision module 18.

The controlling module 11 is configured for controlling incremental movement of the lens module 2. In particular, the controlling module 11 can control the lens module 2 to move via the driving circuit 4 and the motor 3.

The counting module 12 is configured for counting how many steps driven by the motor 3. If the motor 3 drives the lens module 2 to move from the far object distance to the near object distance, every step is counted as +1. For the opposite direction, every step is counted as –1. Every step driven by the motor 3 is counted by the counting module 11 to obtain the counted number of steps.

The comparing module 13 is configured for comparing the counted number of steps with a preset step number. The preset step number is configured for determining whether increments of "x" or "y" should be used for moving the lens module 2. When the counted number is less than the preset step number, the motor 3 drives the lens module 2 to move by increments of "x" (steps). After the counted number is equal to or greater than the preset step number, the motor 3 drives the lens module 2 to move by increments of "y" (steps). In a preferred embodiment, "y" is greater than "x" to speed the AF process.

The image retrieving module 14 is configured for reading each image captured by the lens module 2, which is done initially when the lens module 2 is set to focus on infinity, and then after each incremental movement. The squaring module 15 is configured for calculating an individual sum of the square of a pixel value difference between two adjacent pixels in each row of the image. These individual sums are sent to the memory 5. The summation module 16 is configured for adding the individual sums to obtain a cumulative square sum corresponding to a given object distance lens module 2 focused on.

The updating module 17 is configured for comparing the cumulative square sum of the given object distance with the maximum cumulative square sum stored in the memory 5. If the cumulative square sum of the given object distance is greater than the maximum cumulative square sum stored in the memory 5, the maximum cumulative square sum is updated to the value of the cumulative square sum of the given object distance. The memory 5 also stores the number of steps corresponding to the given object distance as an AF step number.

The decision module 18 is configured for judging whether the lens module 2 driven by the motor 3 is moved to an end of an AF range. When the lens module 2 has moved to the end of the AF range, the motor 3 drives the lens module 2 to move to a position corresponding to the AF step number stored in the memory 5 to complete the AF process.

Figure 4:
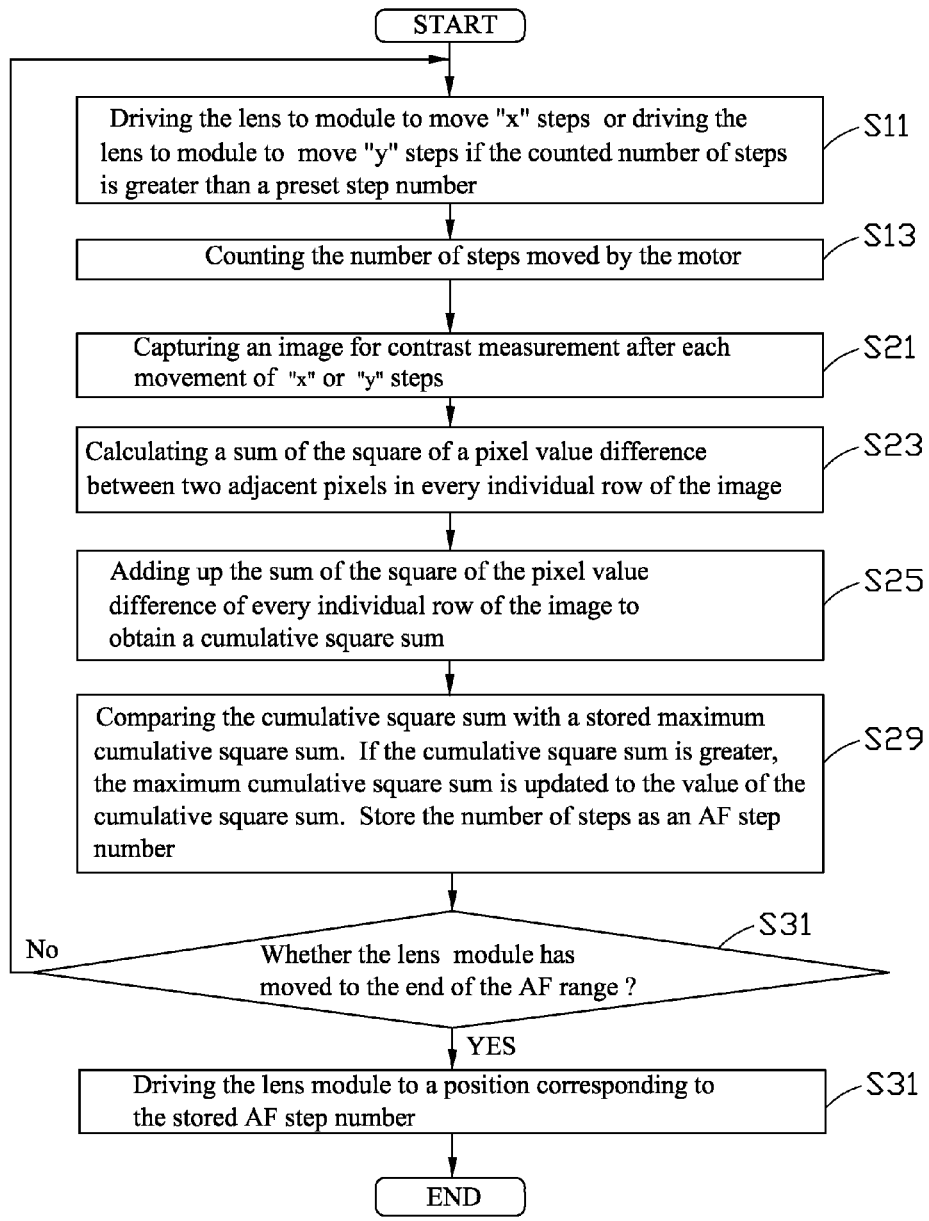
FIG. 4 is a flowchart of a focusing method, in accordance with another exemplary embodiment, executed by the imaging apparatus of FIG. 1.

Referring to FIGS. 1, 3 and 4, a focusing method for controlling the apparatus 1 to auto focus is shown. The method includes:

STEP S11: driving the lens to module to move "x" steps; or driving the lens to module to move "y" steps if the counted number of steps is greater than a preset step number;

STEP S13: counting the number of steps moved by the motor;

STEP S21: capturing an image for contrast measurement after each movement of "x" or "y" steps;

STEP S23: calculating an individual sum of the square of a pixel value difference between two adjacent pixels in every individual row of the image.

STEP S25: adding up every individual sum of the pixel value difference of the every individual row of the image to obtain a cumulative square sum.

STEP S29: comparing the cumulative square sum with a stored maximum cumulative square sum. If the cumulative square sum is greater than the maximum cumulative square sum, the maximum cumulative square sum is updated to the value of the cumulative square sum. Store the number of steps as an AF step number.

STEP S31: judging whether the lens module is moved to an end of an AF range. If the lens module is moved to the end of the AF range, execute STEP S37; if the lens module is not moved to the end of the AF range, go to STEP S11.

STEP S37: driving the lens module to a position corresponding to the AF step number.

It should be understood that the image capturing device is not limited by these embodiments, and can conform to any other device having capturing function such as a mobile phone equipped with a camera module.

Comparing to conventional arts, the present embodiment drives the lens module to move in different increments during the focusing process to speed up the auto focus process. It efficiently reduces the auto focus time of the image pickup apparatus.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An image pickup apparatus comprising:
   a lens module;
   an AF unit configured for controlling an auto focus process by moving the lens module by increments of x steps and y steps;
   a motor configured for driving the lens module; and
   a driving circuit configured to control the motor;
   wherein the AF unit comprises a counting module configured for counting a number of steps driven by the motor to move the lens module, and a comparing module configured for comparing the counted number of steps with a preset step number.

2. The image pickup apparatus as claimed in claim 1, wherein when the counted number of steps is less than the preset step number, the motor drives the lens module to move by increments of x steps.

3. The image pickup apparatus as claimed in claim 1, wherein when the counted number of steps is greater than or equal to the preset step number, the motor drives the lens module to move by increments of y steps.

4. The image pickup apparatus as claimed in claim 1, wherein the AF unit further comprises an image retrieving module configured for capturing an image sensed by the lens module.

5. The image pickup apparatus as claimed in claim 4, wherein the AF unit further comprises a squaring module configured for calculating an individual sum of the square of a pixel value difference between two adjacent pixels in an individual row of the image.

6. The image pickup apparatus as claimed in claim 5, wherein the AF unit further comprises a summation module configured for adding every individual sum of each individual row of the image to obtain a cumulative square sum.

7. An image pickup apparatus comprising:
   a lens module;
   an AF unit configured for controlling an auto focus process by moving the lens module by increments of x steps and y steps; wherein y is greater than x;
   a motor configured for driving the lens module; and
   a driving circuit configured to control the motor.

8. An image pickup apparatus comprising;
a lens module;
an AF unit configured for controlling an auto focus process by moving the lens module by increments of x steps and y steps; wherein the AF unit comprises an image retrieving module configured for capturing an image sensed by the lens module, a squaring module configured for calculating an individual sum of the square of a pixel value difference between two adjacent pixels in an individual row of the image, and a summation module configured for adding every individual sum of each individual row of the image to obtain a cumulative square sum;
a motor configured for driving the lens module;
a driving circuit configured to control the motor; and
a memory configured for storing a maximum cumulative square sum and an auto focus step number.

9. The image pickup apparatus as claimed in claim 8, wherein the AF unit further comprises an updating module configured for updating the maximum cumulative square sum to the value of the cumulative square sum when the cumulative square sum is greater than the maximum cumulative square sum stored in the memory.

10. The image pickup apparatus as claimed in claim 9, wherein when the cumulative square sum is greater than the maximum cumulative square sum, the memory stores the corresponding number of steps as an auto focus step number.

11. The image pickup apparatus as claimed in claim 10, wherein the AF unit further comprises a decision module configured for judging whether the lens module is moved to an end of an auto focus range of the lens module.

12. The image pickup apparatus as claimed in claim 11, wherein when the lens module is moved to the end of the auto focus range, the motor drives the lens module to move to a position corresponding the auto focus step number stored in the memory.

13. A focusing method of an image pickup apparatus, the image pickup apparatus having a lens module, the method comprising:
(a) driving the lens to module to move "x" steps; or driving the lens to module to move "y" steps if the counted number of steps is greater than a preset step number;
(b) counting the number of steps moved by the motor;
(c) capturing an image for contrast measurement after each movement of the incremental movement;
(d) calculating an individual sum of the square of a pixel value difference between two adjacent pixels in every individual row of the image;
(e) adding up every individual sum of the pixel value difference of every individual row of the image to obtain a cumulative square sum;
(f) comparing the cumulative square sum with a stored maximum cumulative square sum; wherein, if the cumulative square sum is greater than the maximum cumulative square sum, the maximum cumulative square sum is updated to the value of the cumulative square sum; store the step number as an AF step number;
(g) judging whether the lens module is moved to an end of an AF range; wherein, if the lens module is moved to the end of the AF range, execute STEP (h); if the lens module is not moved to the end of the AF range then go to STEP (a); and
(h) driving the lens module to a position corresponding to the AF step number.

* * * * *